(12) United States Patent
Kurosawa et al.

(10) Patent No.: US 12,072,414 B2
(45) Date of Patent: Aug. 27, 2024

(54) OBSTACLE DETECTION DEVICE AND OBSTACLE DETECTION METHOD

(71) Applicant: Faurecia Clarion Electronics Co., Ltd., Saitama (JP)

(72) Inventors: Daiki Kurosawa, Saitama (JP); Jun Kuwamura, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 181 days.

(21) Appl. No.: 17/573,728

(22) Filed: Jan. 12, 2022

(65) Prior Publication Data

US 2022/0229179 A1 Jul. 21, 2022

(30) Foreign Application Priority Data

Jan. 19, 2021 (JP) ................................ 2021-006345

(51) Int. Cl.
*G01S 15/931* (2020.01)
*B60W 30/06* (2006.01)
*G01C 21/00* (2006.01)

(52) U.S. Cl.
CPC ........... *G01S 15/931* (2013.01); *B60W 30/06* (2013.01); *B60W 2420/54* (2013.01);
(Continued)

(58) Field of Classification Search
CPC ........................ G01S 15/931; G01S 2015/932; B60W 30/06; B60W 2554/802; B60W 2554/801; B60W 2420/54; G01C 21/3807
See application file for complete search history.

(56) References Cited

U.S. PATENT DOCUMENTS 4,722,410 A * 2/1988 Melocik ............. B60K 31/0008
180/169
4,833,469 A * 5/1989 David ................... G01S 17/931
340/901
(Continued)

FOREIGN PATENT DOCUMENTS

| JP | 2008-158640 A | 7/2008 |
| JP | 2018-180909 A | 11/2018 |
| WO | 2020/070822 A1 | 4/2020 |

OTHER PUBLICATIONS

French Search Report issued on Mar. 23, 2023 in corresponding French patent application No. FR2200355.
(Continued)

*Primary Examiner* — Gertrude Arthur Jeanglaude
(74) *Attorney, Agent, or Firm* — IP Business Solutions, LLC

(57) ABSTRACT

An obstacle detection device includes an acquisition unit configured to acquire path information to a parking position and range information representing a position and a range of an object existing around an own vehicle, an operation control unit configured to generate a driving signal, for operating a traveling driving device that travels a vehicle, according to the path information and outputs the generated driving signal to the traveling driving device, an inside/outside determination unit configured to determine, when receiving surroundings information representing a situation around the own vehicle, whether a target object included in the received surroundings information is an object positioned inside the range represented by the range information or an object positioned outside the range, and an obstacle determination unit configured to determine whether or not the object that has been determined to be positioned outside the range is an obstacle to the own vehicle traveling in a parking path.

5 Claims, 10 Drawing Sheets

(52) U.S. Cl.
CPC . *B60W 2554/801* (2020.02); *B60W 2554/802* (2020.02); *G01C 21/3807* (2020.08); *G01S 2015/932* (2013.01)

(56) References Cited

U.S. PATENT DOCUMENTS

| | | | |
|---|---|---|---|
| 5,461,357 A * | 10/1995 | Yoshioka | G01S 15/931 340/435 |
| 8,705,796 B2 * | 4/2014 | Ogata | G06V 10/50 382/103 |
| 2005/0122218 A1 * | 6/2005 | Goggin | G01S 7/4813 340/552 |
| 2016/0265174 A1 * | 9/2016 | Engelmann | E01C 23/088 |
| 2019/0164427 A1 | 5/2019 | Greenwood | |
| 2020/0114820 A1 | 4/2020 | Ito | |
| 2020/0273343 A1 | 8/2020 | Kim | |
| 2021/0291814 A1 | 9/2021 | Shirozono et al. | |

OTHER PUBLICATIONS

Japanese Office Action mailed by Japanese Patent Office dated on Jul. 2, 2024 in corresponding Japanese patent application No. 2021-006345.

* cited by examiner

OBSTACLE DETECTION DEVICE AND OBSTACLE DETECTION METHOD

INCORPORATION BY REFERENCE

The present application claims priority under 35 U.S.C. § 119 to Japanese Patent Application No. 2021-006345 filed on Jan. 19, 2021. The content of the application is incorporated herein by reference in its entirety.

BACKGROUND OF THE INVENTION

Field of the Invention

The present invention relates to an obstacle detection device and an obstacle detection method.

Description of the Related Art

Conventionally, a device has been known that detects an object existing around a vehicle and determines whether or not the detected object is an obstacle that obstructs a vehicle traveling along a parking path.

For example, Japanese Patent Laid-Open No. 2018-180909 discloses an obstacle detection and notification device including a moving obstacle detection unit that detects a moving obstacle in a monitoring region, a first calculation unit that calculates a movement prediction path of the moving obstacle, a second calculation unit that calculates a movement prediction path of an own vehicle, a removal unit that removes a moving obstacle that is less likely to lead to a warning execution region from a warning target moving obstacle based on the movement prediction path of the moving obstacle and the movement prediction path of the own vehicle, and a warning unit that notifies the warning target moving obstacle of a warning.

SUMMARY OF THE INVENTION

However, the number of objects to be detected is large and it may be erroneously determined that an object contacts or collides with the vehicle, so that the vehicle may stop traveling. If the vehicle stops traveling, a parking path is recalculated. Thus, there is a problem that it takes time to park the vehicle.

The present invention is directed to providing an obstacle detection device and an obstacle detection method in which a detection accuracy of an obstacle that obstructs a traveling vehicle is improved to shorten a time period required until the vehicle is parked.

To attain the above-described object, an obstacle detection device according to an aspect of the present invention includes an input interface connected to an external device, an acquisition unit configured to acquire path information as information about a parking path to a parking position where a vehicle is to be parked and range information representing a position and a range of an object existing around the vehicle, an operation control unit configured to generate a driving signal according to the path information acquired by the acquisition unit and outputs the generated driving signal to a traveling driving unit configured to travel the vehicle, the driving signal being for operating the traveling driving unit, an inside/outside determination unit configured to determine, when receiving surroundings information representing a situation around the vehicle from the external device via the input interface, whether an object included in the received surroundings information is an object positioned inside the range represented by the range information acquired by the acquisition unit or an object positioned outside the range, and an obstacle determination unit configured to determine whether or not the object that has been determined to be positioned outside the range by the inside/outside determination unit is an obstacle to the vehicle traveling in the parking path.

The aspect of the present invention makes it possible to improve a detection accuracy of an obstacle that obstructs a traveling vehicle to shorten a time period required until the vehicle is parked.

DETAILED DESCRIPTION OF THE PREFERRED EMBODIMENT

An embodiment of the present invention will be described below with reference to the accompanying drawings.

Figure 1:
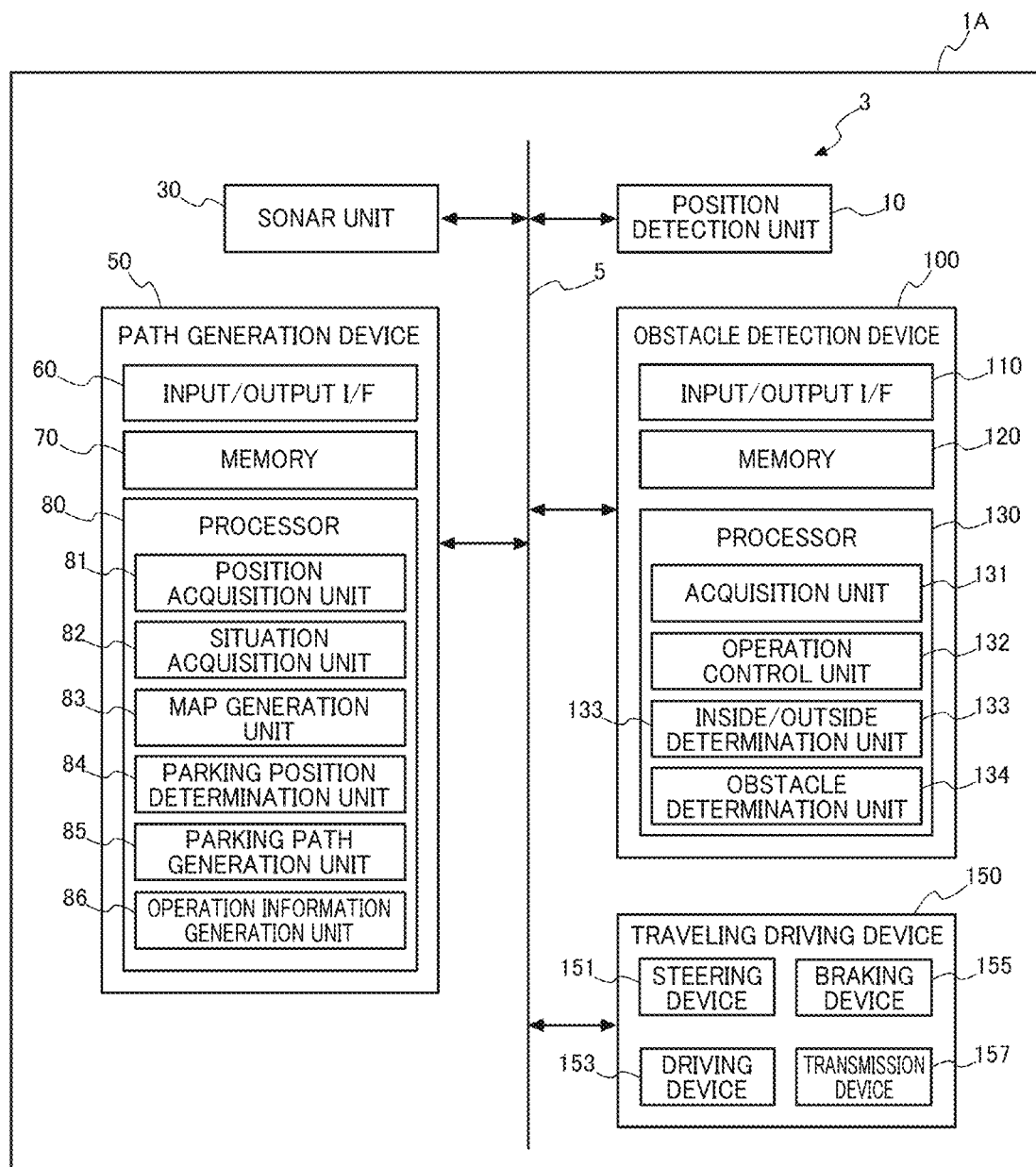
FIG. 1 is a block diagram illustrating a configuration of an in-vehicle apparatus.

FIG. 1 is a diagram illustrating a configuration of an in-vehicle apparatus 3 mounted on a vehicle. In the following description, the vehicle having the in-vehicle apparatus 3 mounted thereon is referred to as an own vehicle 1A.

The in-vehicle apparatus 3 has a configuration in which a position detection unit 10, a sonar unit 30, a path generation device 50, an obstacle detection device 100, and a traveling driving device 150 are connected to one another via a communication bus 5. The communication bus 5 is a bus for data communication according to a standard such as Ethernet (registered trademark), a CAN (controller area network), or an LIN (local interconnect network).

The position detection unit 10 detects a position of the own vehicle 1A. The position detection unit 10 includes a GNSS (global navigation satellite system) receiver and a processor (Neither is illustrated). The GNSS receiver receives a signal to be transmitted from a satellite. The processor operates a longitude and a latitude as position information of the own vehicle 1A based on the signal received by the GNSS receiver and an orientation of the own vehicle 1A due to a difference in calculated position information. The position detection unit 10 outputs operated position information and orientation information of the own vehicle 1A to the path generation device 50.

The sonar unit 30 is mounted on a plurality of portions such as the front, the rear, the left, and the right of the own vehicle 1A, and detects an object existing around the own vehicle 1A using an ultrasonic wave. Specifically, the sonar unit 30 detects information about a distance to the object and an orientation based on the own vehicle 1A, for example. The sonar unit 30 outputs sensor data representing a sensing result to the path generation device 50 and the obstacle detection device 100.

Although a case where the in-vehicle apparatus 3 includes a sonar will be described, a sensor mountable on the in-vehicle apparatus 3 is not limited to the sonar. For example, a radar and a lidar (LIDAR: laser imaging detection and ranging) capable of measuring a distance from an object using a radio wave, light, or the like may be mounted on the in-vehicle apparatus 3. A camera may be mounted on the in-vehicle apparatus 3.

The path generation device 50 is a computer device including an input/output interface (the interface is hereinafter abbreviated as I/F) 60 (CAN transceiver, transceiver, Ethernet PHY), a memory 70, and a processor 80 (first processor). The path generation device 50 may be configured to include a storage device such as an HDD (hard disk drive) and an SSD (solid state drive), for example, in addition to the devices.

The input/output I/F 60 is connected to the communication bus 5, and performs data communication with an external device connected to the communication bus 5. The external device includes the position detection unit 10, the sonar unit 30, and the obstacle detection device 100.

The memory 70 includes a ROM (read only memory) and a RAM (random access memory). The memory 70 may include a nonvolatile semiconductor memory such as a flash memory. The memory 70 stores a computer program to be executed by the processor 80, data to be processed when the processor 80 executes the computer program, and data representing a processing result. The memory 70 stores sensor data outputted by the sonar unit 30.

The processor 80 includes a CPU (central processing unit) and an MPU (microprocessor unit).

The path generation device 50 includes a position acquisition unit 81, a situation acquisition unit 82, a map generation unit 83, a parking position determination unit 84, a parking path generation unit 85, and an operation information generation unit 86, respectively, as functional components. Each of the functional components is a function to be implemented when the processor 80 performs an operation according to the computer program.

The position acquisition unit 81 receives the position information and the orientation information of the own vehicle 1A calculated by the position detection unit 10. The position acquisition unit 81 corrects the position information and the orientation information received from the position detection unit 10 using a well-known dead reckoning method. The position acquisition unit 81 outputs the corrected position information and orientation information to the map generation unit 83. The position acquisition unit 81 outputs the corrected position information and orientation information to the obstacle detection device 100. The position information and the orientation information will be hereinafter referred to as position and orientation information.

The situation acquisition unit 82 causes the sonar unit 30 to perform sensing, and acquires sensor data as a detection result of the sonar unit 30 as surroundings information. The situation acquisition unit 82 causes the memory 70 to temporarily store the acquired sensor data.

The map generation unit 83 generates peripheral map 200 (see FIG. 4) representing a situation around the own vehicle 1A based on the position and orientation information received from the position acquisition unit 81 and the sensor data acquired from the memory 70. In the peripheral map 200, a position of the own vehicle 1A, a position of an object existing around the own vehicle 1A and a distance to the object, and a position of a parking frame such as a white line painted on a road surface of a parking lot, for example, are recorded. The object to be recorded on the peripheral map 200 includes other vehicles and structures such as a pillar and a wall of the parking lot, for example. The object is hereinafter referred to as a target object. The parking frame is painted on the road surface in a predetermined thickness, whereby a spacing corresponding to the thickness of the white line is detected as a periodical feature.

Figure 2:
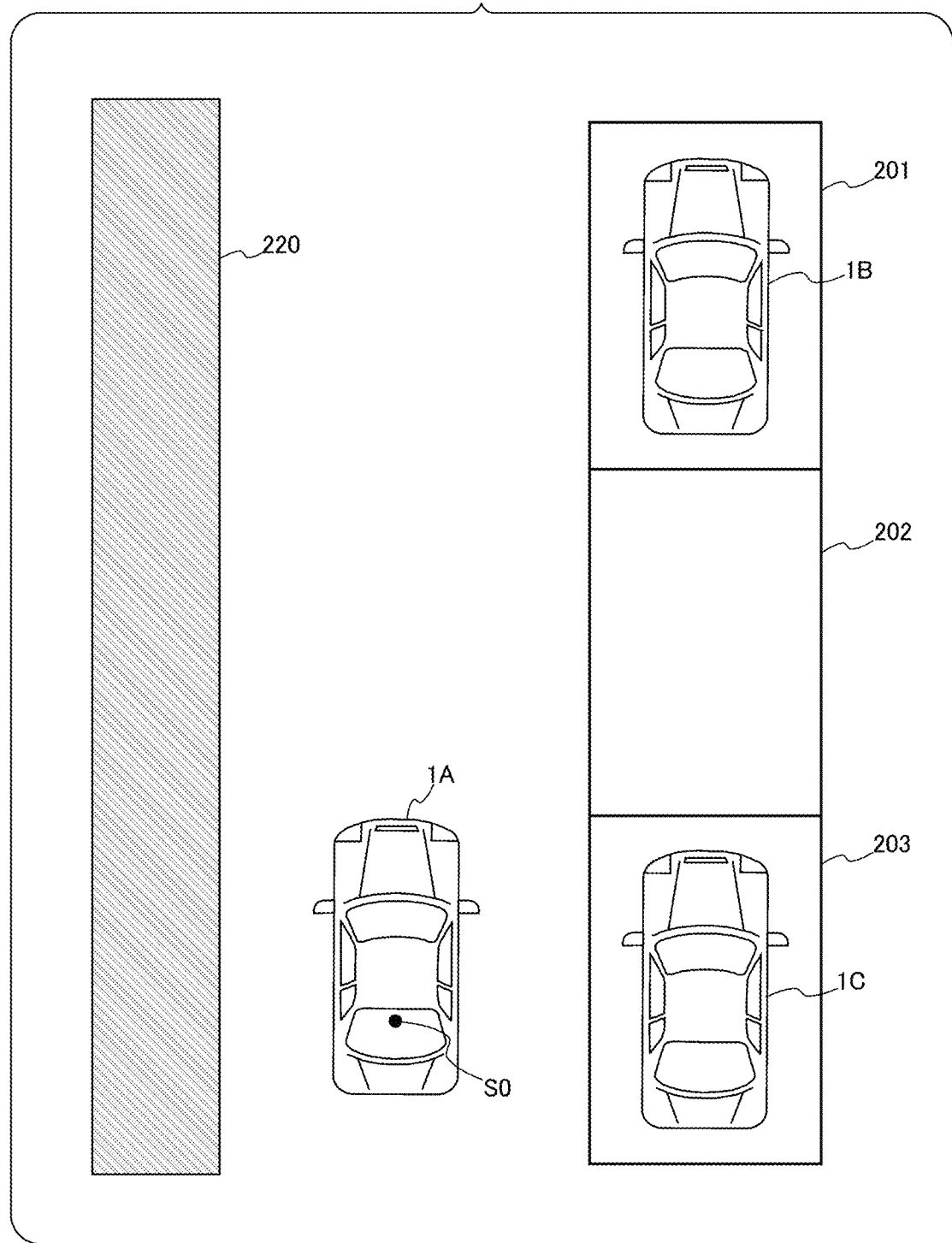
FIG. 2 is a diagram illustrating a state where an own vehicle and a situation around the own vehicle are viewed from the top.

The map generation unit 83 generates, when recording a position and a range of a detected target object on the peripheral map 200, a range graphic representing the range of the target object, and records the generated range graphic on the peripheral map 200. The range graphic to be generated by the map generation unit 83 will be described with reference to FIGS. 2 to 4. FIG. 2 is a diagram illustrating the own vehicle 1A and a situation around the own vehicle 1A as viewed from the top.

As illustrated in FIG. 2, three parking regions 201, 202, and 203 exist on the right side of the own vehicle 1A, and a wall 220 is installed on the left side of the own vehicle 1A. Another vehicle 1B is parked in the parking region 201, and another vehicle 1C is parked in the parking region 203. In FIG. 2, a position of the own vehicle 1A is referred to as a position S0. The position S0 represents a reference position of the own vehicle 1A. The reference position is a previously set position of the own vehicle 1A, and may be a center position in a vehicle width direction of a front wheel or a rear wheel, a position of a center of gravity of the own vehicle 1A, or a center position in a vehicle length direction and the vehicle width direction, for example.

Figure 3:
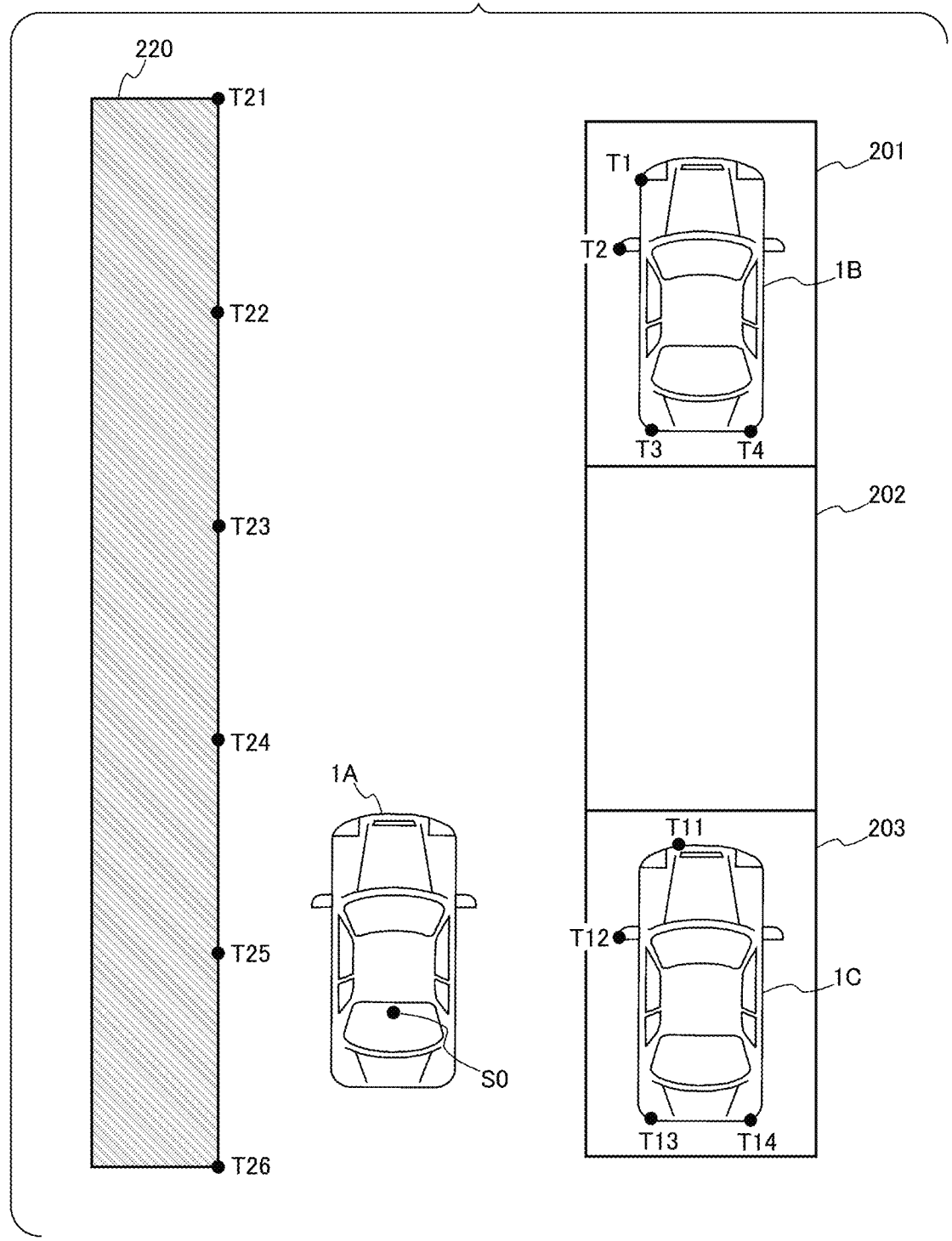
FIG. 3 is a diagram illustrating a position of a detection point detected by a sonar unit.

FIG. 3 is a diagram illustrating a position of a detection point T detected by the sensor data from the sonar unit 30 until the own vehicle 1A moves to the position S0 illustrated in FIG. 2. In an example illustrated in FIG. 3, a case is illustrated where T1, T2, T3, and T4 are detected as a detection point T of the other vehicle 1B and T11, T12, T13, and T14 are detected as a detection point T of the other vehicle 1C. A case is illustrated where T21, T22, T23, T24, T25, and T26 are detected as a detection point T of the wall 220. FIG. 3 does not illustrate all the detection points T detected by the sensor data from the sonar unit 30, but the sonar unit 30 actually detects a target object with more detailed accuracy.

Figure 4:
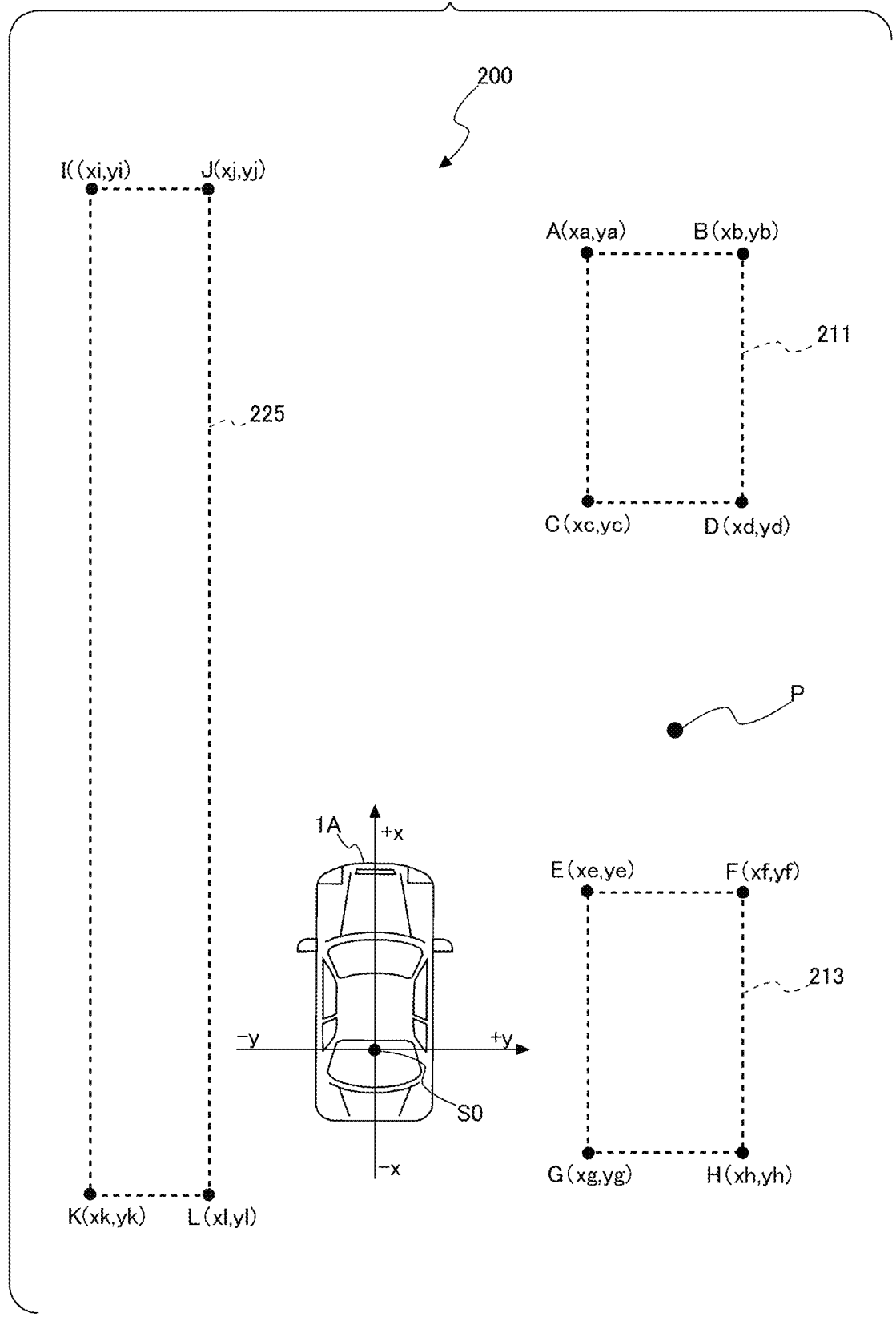
FIG. 4 is a diagram illustrating an example of a peripheral map.

FIG. 4 is a diagram illustrating one example of the peripheral map 200 generated by the map generation unit 83.

A coordinate system having the position S0 of the own vehicle 1A as an origin and having an x-axis and a y-axis as two axes perpendicular to each other is set in the peripheral map 200. The x-axis is a direction parallel to the vehicle length direction of the own vehicle 1A, and the y-axis is a direction parallel to the vehicle width direction of the own vehicle 1A. The position S0 of the own vehicle 1A is a position represented by the position and orientation information acquired by the position acquisition unit 81. On the peripheral map 200, rectangular range graphics 211, 213, and 225 generated by the map generation unit 83 based on coordinates of the detection point T are recorded.

The range graphic 211 is a rectangular graphic representing a range of the other vehicle 1B as a target object, the range graphic 213 is a rectangular graphic representing a range of the other vehicle 1C as a target object, and the range graphic 225 is a rectangular graphic representing a range of the wall 220 as a target object.

Although graphics corresponding to specific shapes of the other vehicle 1B, the other vehicle 1C, and the wall 220 may be respectively generated as the range graphics 211, 213, and 225 each representing the range of the target object, a processing load of the path generation device 50 increases, and it takes time to perform processing for generating the graphics. Accordingly, the map generation unit 83 collects sensor data that can be determined as data which one target object has been detected among sensor data into one, to generate the range graphics 211, 213, and 225 each representing the range of the target object. The map generation unit 83 determines that data in which the interval between the positions indicated by the sensor data is equal to or less than a previously set distance is data of one object.

The map generation unit 83 selects the detection points T respectively representing a maximum value and a minimum value in an x-axis direction and a maximum value and a minimum value in a y-axis direction for each of the target objects.

For the other vehicle 1B, for example, T1 is selected as the detection point T representing the maximum value in the x-axis direction, and T3 or T4 is selected as the detection point T representing the minimum value in the x-axis direction. T4 is selected as the detection point T representing the maximum value in the y-axis direction, and T2 is selected as the detection point T representing the minimum value in the y-axis direction.

The map generation unit 83 generates the rectangular range graphics 211, 213, and 225 based on the coordinates of the selected detection point T. For example, the map generation unit 83 generates a graphic constitute by a first side passing through the detection point T1 representing the maximum value in the x-axis direction and parallel to the y-axis, a second side passing through the detection point T3 representing the minimum value in the x-axis direction and parallel to the y-axis, a third side passing through the detection point T4 representing the maximum value in the y-axis direction and parallel to the x-axis, and a fourth side passing through the detection point T2 representing the minimum value in the y-axis direction and parallel to the x-axis as the range graphic 211 representing the range of the other vehicle 1B.

The range graphic 211 is a graphic having a point A (xa, ya), a point B (xb, yb), a point C (xc, yc), and a point D (xd, yd) illustrated in FIG. 4, respectively, as four vertexes.

The range graphic 213 is a graphic having a point E (xe, ye), a point F (xf, yf), a point G (xg, yg), and a point H (xh, yh), respectively, as four vertexes.

The range graphic 225 is a graphic having a point I (xi, yi), a point J (xj, yj), a point K (xk, yk), and a point L (xl, yl), respectively, as four vertexes.

If the own vehicle 1A is positioned at the position S0 illustrated in FIGS. 2 to 4, respective positions on surfaces, on the opposite side to the side facing the own vehicle 1A, of the other vehicles 1B and 1C cannot be measured with high accuracy in the sensor data from the sonar unit 30. Similarly, if the own vehicle 1A is positioned at the position S0, a position on a surface, on the opposite side to the side facing the own vehicle 1A, of the wall 220 cannot be measured. However, the respective positions on the surfaces, on the opposite side to the side facing the own vehicle 1A, of the other vehicles 1B and 1C and the wall 220 are not required to have an accuracy from the viewpoint of collision detection, and therefore previously set values may be respectively set. For example, a y-coordinate value of the point B of the range graphic 211 may be set to a value obtained by adding or subtracting the previously set value to or from a y-coordinate value of the point A (xa, ya), and a y-coordinate value of the point D of the range graphic 211 may be set to a value obtained by adding or subtracting a previously set value to or from a y-coordinate value of the point C (xc, yc).

The parking position determination unit 84 refers to the peripheral map 200 generated by the map generation unit 83, to determine a parking frame in which the own vehicle 1A is to be parked. For example, the parking position determination unit 84 selects a parking frame in which a target object is not detected and a distance from the own vehicle 1A is a previously set distance or less from among parking frames recorded on the peripheral map 200. The parking position determination unit 84 sets a position and an angle at which the own vehicle 1A is to be parked within the selected parking frame, to determine a parking position P.

The parking path generation unit 85 generates a parking path R for parking the own vehicle 1A at the parking position P determined by the parking position determination unit 84. The parking path R is a path for moving the own vehicle 1A to the parking position P from the position S0 of the own vehicle 1A. Known means is used to perform processing for generating the parking path.

The operation information generation unit 86 receives information about the parking path R generated by the parking path generation unit 85. The operation information generation unit 86 generates operation information as information for causing the obstacle detection device 100 to control the traveling driving device 150 based on the received information about the parking path R.

The operation information generation unit 86 refers to the peripheral map 200 generated in the memory 70 by the map generation unit 83, to acquire respective coordinates at the four vertexes of each of the range graphics 211, 213, and 225 each representing the position and the range of the target object.

The operation information generation unit 86 outputs control information including path information as the information about the parking path R, range information as the information about the four vertexes of each of the range graphics 211, 213, and 225, and the generated operation information to the obstacle detection device 100.

The obstacle detection device 100 is a computer device including the input/output I/F 110 (CAN transceiver, transceiver, Ethernet PHY), the memory 120, and the processor 130 (second processor). The obstacle detection device 100 may be configured to include a storage device such as an HDD or an SSD, for example, in addition to the devices.

The input/output I/F 110 is connected to the communication bus 5, and performs data communication with an external device connected to the communication bus 5. The external device includes the position detection unit 10, the sonar unit 30 and the path generation device 50, and the traveling driving device 150.

The memory 120 includes a ROM (read only memory) and a RAM (random access memory). The memory 120 may include a nonvolatile semiconductor memory such as a flash memory. The memory 120 stores a computer program to be executed by the processor 130, data to be processed when the processor 130 executes the computer program, and data representing a processing result. The memory 120 stores sensor data outputted by the sonar unit 30 and control information received from the path generation device 50.

The processor 80 includes a CPU and an MPU.

The obstacle detection device 100 includes an acquisition unit 131, an operation control unit 132, an inside/outside determination unit 133, and an obstacle determination unit 134, respectively, as functional components. Each of the functional components is a function to be implemented when the processor 80 performs an operation according to the computer program.

The acquisition unit 131 acquires range information and sensor data included in the control information stored in the memory 120. The acquisition unit 131 outputs the acquired range information and sensor data to the inside/outside determination unit 133.

The acquisition unit 131 outputs operation information stored in the memory 120 to the operation control unit 132.

Further, the acquisition unit 131 acquires path information stored in the memory 120. The acquisition unit 131 outputs the acquired path information to the obstacle determination unit 134.

The operation control unit 132 generates, when receiving the operation information from the acquisition unit 131, driving information for driving each of the units in the traveling driving device 150 according to the received operation information. The operation control unit 132 outputs the generated driving information to the traveling driving device 150.

Here, the traveling driving device 150 will be described.

The traveling driving device 150 includes a steering device 151, a driving device 153, a braking device 155, and a transmission device 157.

The steering device 151 is a device including an actuator that steers a steering wheel of the own vehicle 1A. The operation control unit 132 drives the actuator based on the driving information, and steers the steering wheel.

The driving device 153 is a device including an actuator that adjusts a driving force of a driving wheel of the own vehicle 1A. When a power source of the own vehicle 1A is an engine, a throttle actuator corresponds to the actuator. When the power source is a motor, the motor corresponds to the actuator. The operation control unit 132 drives the actuator based on the driving information, and adjusts the driving force of the driving wheel of the own vehicle 1A.

The braking device 155 is a device including an actuator that drives a brake system provided in the own vehicle 1A and applies a braking force to the wheel of the own vehicle 1A.

The operation control unit 132 drives the actuator based on the driving information, and controls the braking force to be applied to the wheel of the own vehicle 1A.

The transmission device 157 is a device including a transmission and an actuator.

The operation control unit 132 drives the actuator based on the driving information, and switches a speed change ratio of the transmission and forward traveling and reverse traveling of the own vehicle 1A.

Figure 6:
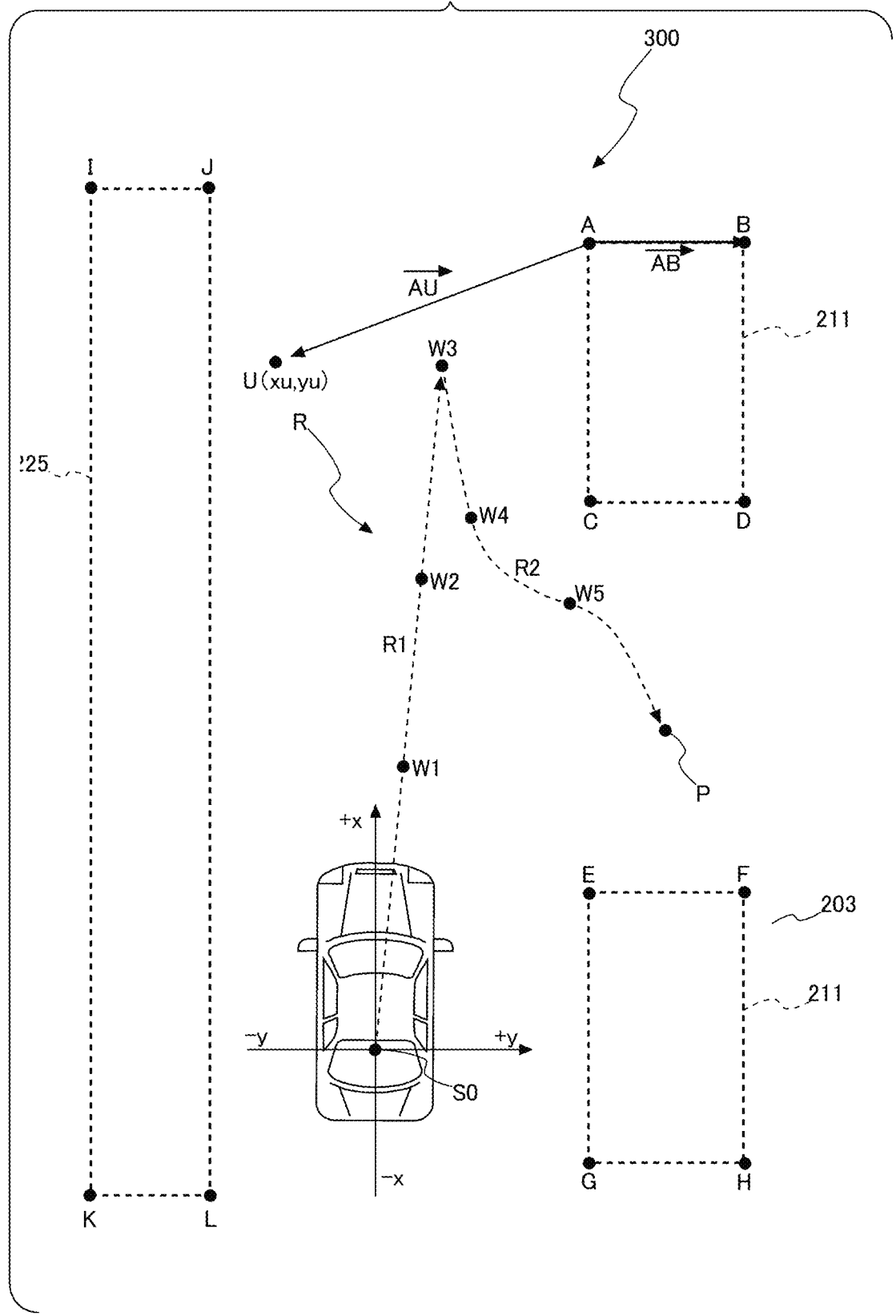
FIG. 6 is a diagram illustrating an example of an obstacle map and a diagram illustrating a determination point set in a parking path.
Figure 7:
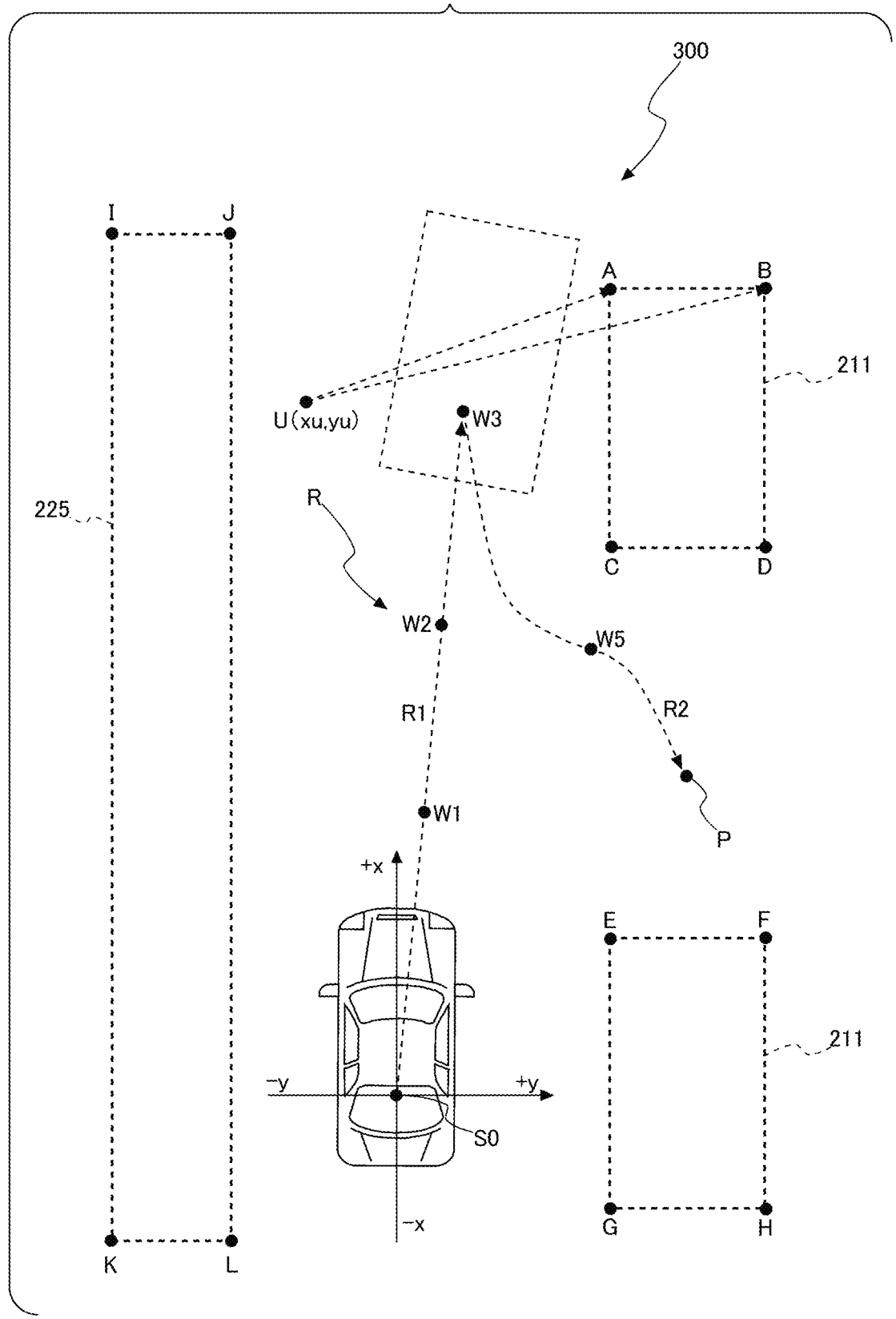
FIG. 7 is a diagram illustrating an example of an obstacle map and a diagram illustrating an own vehicle graphic.

The inside/outside determination unit 133 receives the range information from the acquisition unit 131. The inside/outside determination unit 133 loads a range graphic representing a position and a range of a target object represented by the received range information into the memory 120, to generate an obstacle map 300. An example of the obstacle map 300 is illustrated in FIGS. 5 to 7.

The inside/outside determination unit 133 acquires, when receiving the sensor data from the acquisition unit 131, information about the target object included in the received sensor data. That is, the inside/outside determination unit 133 acquires information about a distance to the target object represented by the sensor data received from the sonar unit 30 and an orientation of the target object based on the own vehicle 1A. The inside/outside determination unit 133 determines whether the target object is positioned inside or outside the range graphics 211, 213, and 225 illustrated on the obstacle map 300 based on the information about the distance to the acquired target object and the orientation, for example.

Figure 5:
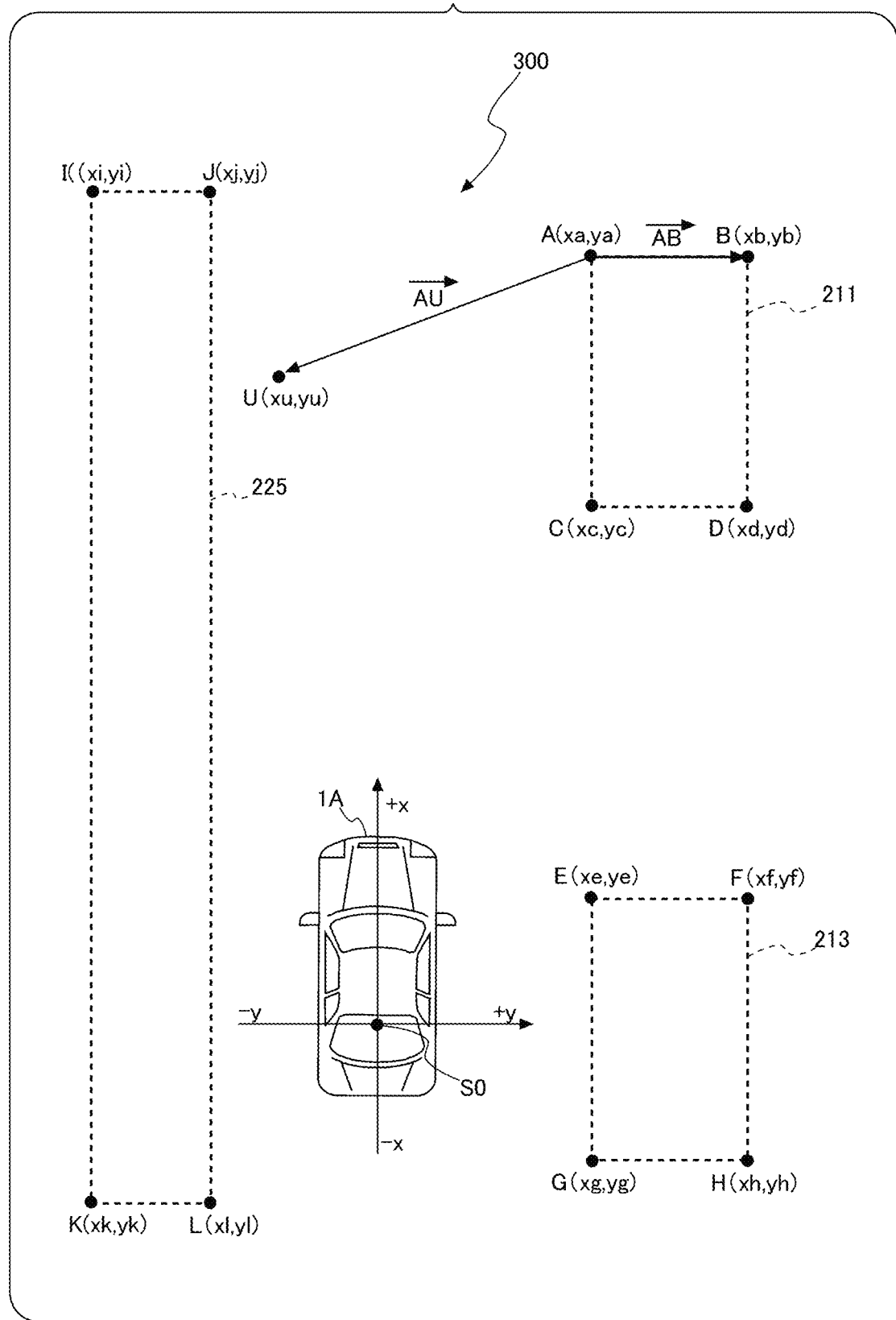
FIG. 5 is a diagram illustrating an example of an obstacle map.

FIG. 5 is diagram illustrating an example of the obstacle map 300 generated by the inside/outside determination unit 133.

On the obstacle map 300, a coordinate system having a position S0 of an own vehicle 1A as an origin and having an x-axis and a y-axis as two axes perpendicular to each other is also set.

A point U illustrated in FIG. 5 represents a position of a target object detected by sensor data. It is assumed that coordinates of the point U are (xu, yu).

The inside/outside determination unit 133 first selects one of target range graphics. A case where a range graphic 211 has been selected will be described. The inside/outside determination unit 133 selects two adjacent vertexes among four vertexes of the range graphic 211. In FIG. 5, a state where a point A and a point B have been respectively selected as the two adjacent vertexes.

The point A is positioned upstream when the vertex of the range graphic 211 is selected clockwise, and the point B is positioned downstream when the vertex of the range graphic 211 is selected clockwise. The inside/outside determination unit 133 generates a vector AB having the point A positioned upstream as a starting point and having the point B positioned downstream as a final point and a vector AU having the point A as a starting point and the point U as a final point. A component of the vector AB is (xb-xa, yb-ya), and a component of the vector AU is (xu-xa, yu-ya).

Then, the inside/outside determination unit 133 calculates an outer product AB×AU of the vector AB and the vector AU.

$$\text{Vector}AB \times \text{Vector}AU = \{(xb-xa)\cdot(yu-ya)\} - \{(xu-xa)\cdot(yb-xa)\}$$

At this time, the inside/outside determination unit 133 generates a formula of the outer product such that the vector (e.g., the vector AB) connecting the two vertexes of the range graphic 211 precedes the vector (e.g., the vector AU) connecting the one vertex of the range graphic 211 and coordinates of the target object.

The inside/outside determination unit 133 also calculates an outer product of the other two adjacent vertexes of the range graphic 211 and the point U of the target object in addition to the outer product of the vector AB and the vector AU. Specifically, the inside/outside determination unit 133 calculates an outer product of a vector BD and a vector BU (the vector BD×the vector BU), an outer product of a vector DC and a vector DU (the vector DC×the vector DU), and an outer product of a vector CA and a vector CU (the vector CA×the vector CU).

The inside/outside determination unit 133 determines that the point U of the target object is positioned outside the range graphic 211 when calculation results of the outer products include even one positive value. The inside/outside determination unit 133 determines that the point U is positioned inside the range graphic 211 when the calculation results of the outer products are all negative values.

The inside/outside determination unit 133 determines, for all the other range graphics 213 and 225 represented by the range information, whether the point U of the target object is positioned inside or outside the range graphics 213 and 225. The inside/outside determination unit 133 determines that the point U of the target object as an obstacle determination target when determining that the point U of the target object is positioned outside all the range graphics 211, 213, and 225. The inside/outside determination unit 133 determines that the point U of the target object is not the obstacle determination target when determining that the point U of the target object is positioned inside any one of the range graphics 211, 213, and 225. For example, if the point U of the target object is a point in the range graphic 211, the point U of the target object is determined as a point at which the other vehicle 1B has been detected. The path generation device 50 generates a parking path R in consideration of a position of the other vehicle 1B. Thus, when the point U of the target object is a point in the range graphic 211, even if the own vehicle 1A is traveled along the parking path R, the own vehicle 1A does not contact or collie with the target object. The inside/outside determination unit 133 excludes the point U of the target object from the obstacle determination target when determining that the point U of the target object is positioned inside any one of the range graphics 211, 213, and 225. The inside/outside determination unit 133 outputs coordinates of the point U of the target object that has been determined as the obstacle determination target to the obstacle determination unit 134.

FIGS. 6 and 7 are diagrams each illustrating an obstacle map 300.

The obstacle determination unit 134 receives coordinates of a point U of a target object that has been determined to be positioned outside all range graphics 211, 213, and 225 by the inside/outside determination unit 133, path information acquired by the acquisition unit 131, and position and orientation information.

The obstacle determination unit 134 determines whether or not the point U of the target object the coordinates of which have been received is an obstacle to the own vehicle 1A traveling in a parking path R. The obstacle determination unit 134 determines the target object that has been determined to contact or collide with the own vehicle 1A traveling in the parking path as an obstacle.

The obstacle determination unit 134 first sets a plurality of determination points W on the parking path R represented by the path information. For example, the obstacle determination unit 134 sets the determination point W for each previously set distance. FIG. 6 illustrates a state where the parking path R includes a path R1 and a path R2 and five determination points W1, W2, W3, W4, and W5 are set in the path R1 and the path R2.

The obstacle determination unit 134 operates an orientation when the own vehicle 1A traveling along the parking path R has moved to the determination point W when a distance between the own vehicle 1A and the determination point W is a predetermined distance or less and operates a range occupied by the own vehicle 1A when the own vehicle 1A is positioned at the determination point W. The obstacle determination unit 134 loads an own vehicle graphic 310 representing the operated range of the own vehicle 1A into the obstacle map 300. FIG. 7 illustrates the own vehicle graphic 310 when the own vehicle 1A is positioned at the determination point W3.

The obstacle determination unit 134 calculates a distance between coordinates of the point U of the target object received from the inside/outside determination unit 133 and the own vehicle graphic 310, and determines whether or not the own vehicle 1A contacts or collides with the target object.

The obstacle determination unit 134 determines, when the distance between the own vehicle graphic 310 and the coordinates of the point U of the target object is a previously set distance or less, that the target object is an obstacle. The obstacle determination unit 134 instructs the operation control unit 132 to stop traveling the own vehicle 1A when determining that the target object is an obstacle.

The operation control unit 132 stops traveling the own vehicle 1A when receiving the coordinates of the target object that has been determined as an obstacle by the obstacle determination unit 134. The operation control unit 132 notifies the path generation device 50 that the traveling of the own vehicle 1A is stopped, and causes the path generation device 50 to generate a parking path capable of avoiding contact or collision with the obstacle again.

Figure 8:
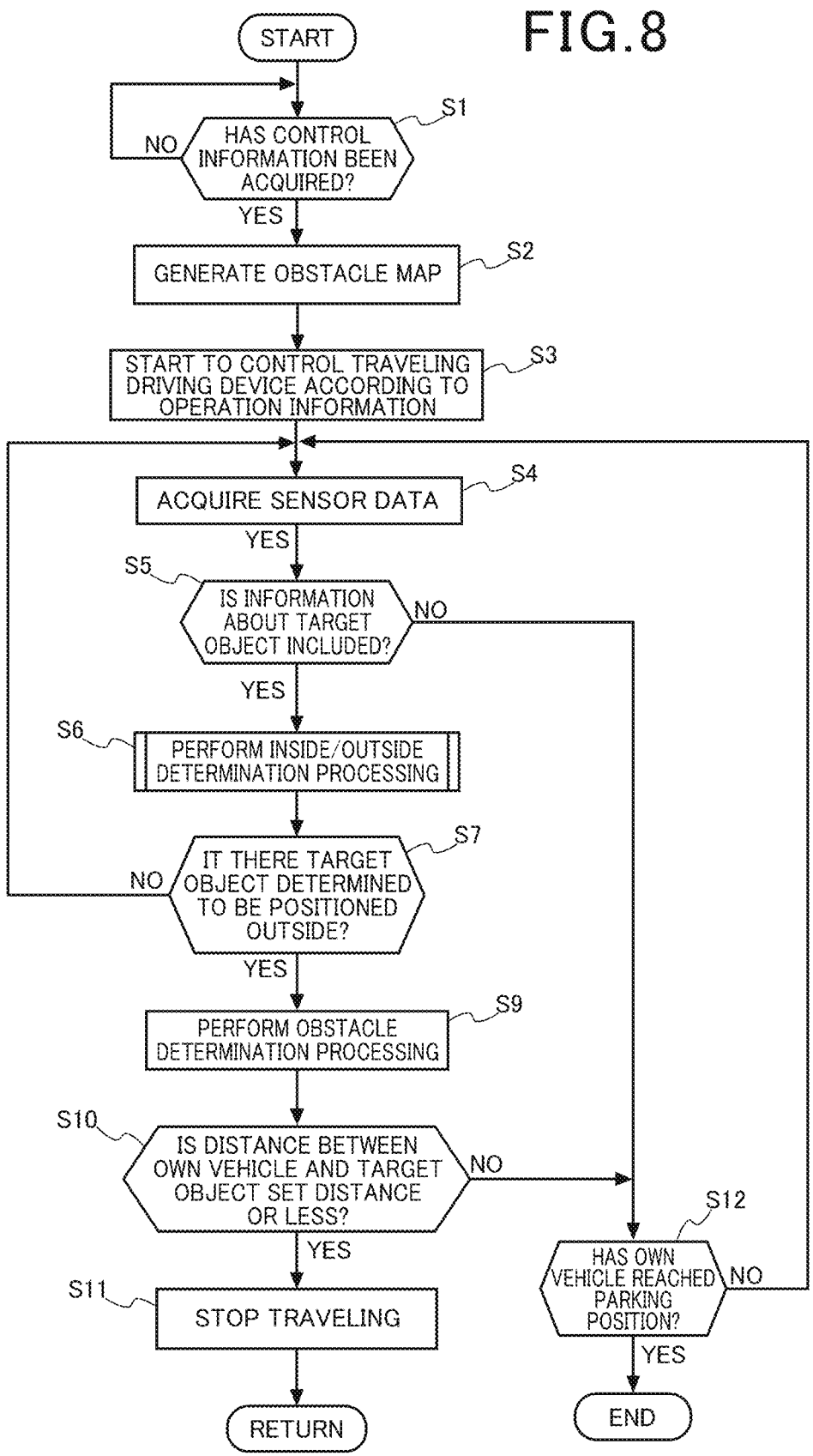
FIG. 8 is a flowchart illustrating an operation of an obstacle detection device.
Figure 9:
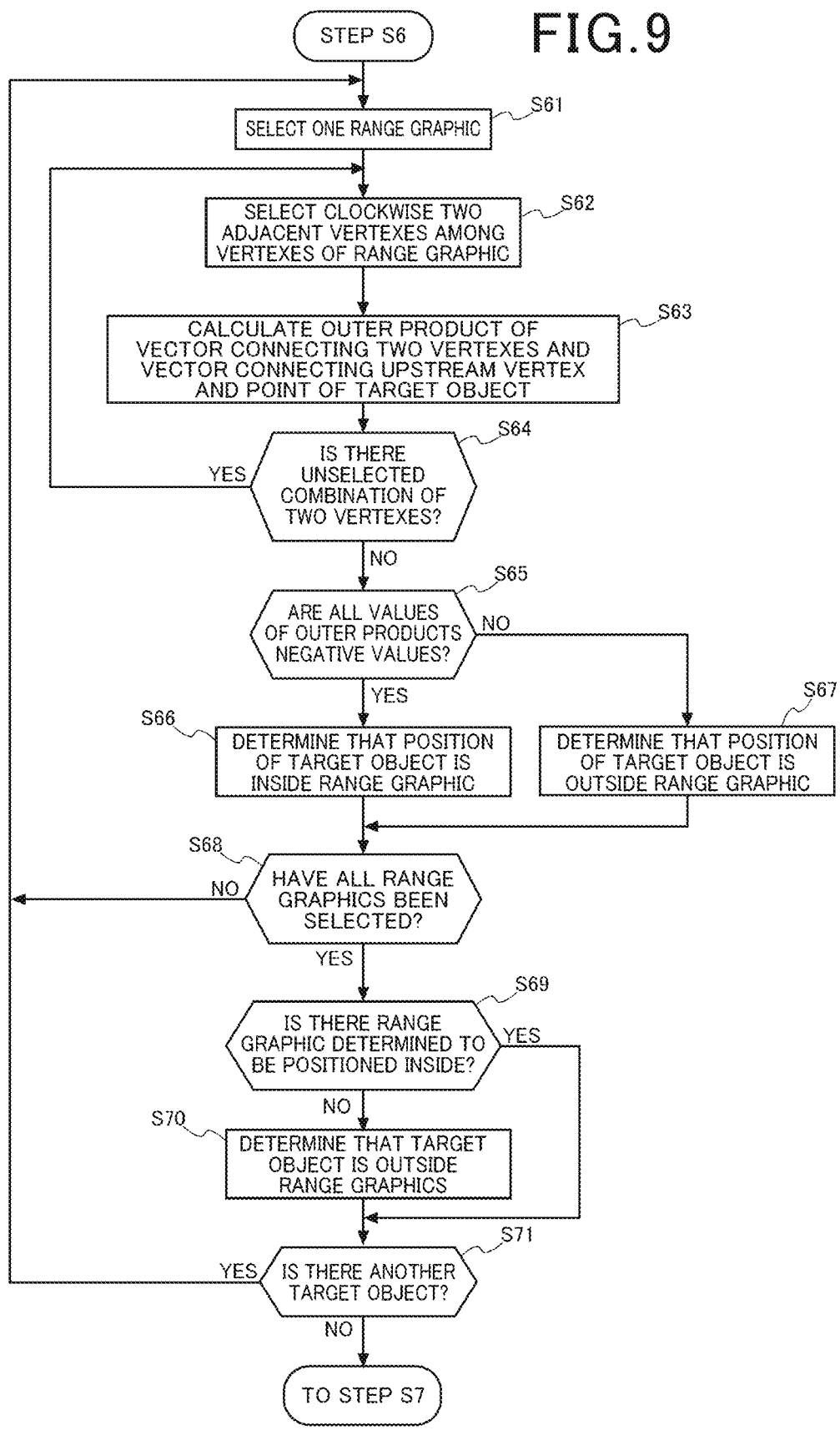
FIG. 9 is a flowchart illustrating an operation of the obstacle detection device.

FIGS. 8 and 9 are flowcharts each illustrating an operation of the obstacle detection device 100.

The operation of the obstacle detection device 100 will be described with reference to the flowcharts of FIGS. 8 and 9.

First, the obstacle detection device 100 determines whether or not control information has been acquired from the path generation device 50 (step S1). The path generation device 50 generates path information, range information, and operation information, and outputs the generated information to the obstacle detection device 100 as control information. The obstacle detection device 100 temporarily stores the received control information to the memory 120. The obstacle detection device 100 reads out the control information from the memory 120, to determine that the control information has been acquired. Step S1 corresponds to an acquisition step.

The obstacle detection device 100 generates, when acquiring the control information (YES in step S1), the obstacle map 300 in the memory 120 based on the range information included in the control information (step S2). The obstacle detection device 100 records a range graphic representing a position and a range represented by the range information on the obstacle map 300, to generate the obstacle map 300.

Then, the obstacle detection device 100 generates a driving signal that operates each of the units in the traveling driving device 150 according to the operation information included in the control information. The operation control unit 132 outputs the generated driving signal to the traveling driving device 150, to start traveling of the own vehicle 1A (step S3). As a result, an own vehicle 1A starts to travel to a parking position P according to a parking path generated by the path generation device 50. Step S3 corresponds to an output step.

Then, the obstacle detection device 100 acquires sensor data representing a detection result of the sonar unit 30 from the memory 120 (step S4). The obstacle detection device 100 determines whether or not information about a target object is included in the acquired sensor data (step S5). The obstacle detection device 100 acquires information about a distance to the target object and an orientation of the target object based on the own vehicle 1A.

If the obstacle detection device 100 cannot acquire the information about the target object from the sensor data (NO in step S5), the obstacle detection device 100 acquires position and orientation information from the position acquisition unit 81, and determines whether or not the own vehicle 1A has reached the parking position P based on the acquired position and orientation information (step S12).

If the obstacle detection device 100 determines that the own vehicle 1A has reached the parking position P (YES in step S12), the processing flow ends. If the obstacle detection device 100 determines that the own vehicle 1A has not reached the parking position P (NO in step S12), the obstacle detection device 100 acquires the sensor data again (step S4), and determines whether or not the target object has been detected.

If the target object has been detected in determination in step S5 (YES in step S5), the obstacle detection device 100 performs inside/outside determination processing for determining whether the detected target object is positioned inside or outside a range graphic (step S6). Details of the inside/outside determination processing will be described with reference to a flowchart of FIG. 9. Step S6 corresponds to an inside/outside determination step.

If the target object that has been determined to be positioned outside the range graphic does not exist as a result of the inside/outside determination processing (NO in step S7), the processing flow returns to step S4. In step S4, the obstacle detection device 100 acquires sensor data. If the target object that has been determined to be positioned outside the range graphic exists (YES in step S7), the obstacle detection device 100 performs obstacle determination processing for determining whether or not the detected target object is an obstacle that contacts or collides with the own vehicle 1A traveling along the parking path (step S9). Step S9 corresponds to an obstacle determination step.

The obstacle detection device 100 sets a plurality of determination points W on the parking path, and calculates an orientation of the own vehicle 1A at the set determination point W based on the position and orientation information received from the position acquisition unit 81. The obstacle detection device 100 generates an own vehicle graphic representing a range of the own vehicle 1A when the own vehicle 1A is positioned at the calculated determination point W based on the calculated orientation of the own vehicle 1A at the determination point W. The obstacle detection device 100 determines whether or not a distance between the generated own vehicle graphic and the detected target object is a previously set distance or less (step S10). If the distance between the own vehicle graphic and the target object is the previously set distance or less (YES in step S10), the obstacle detection device 100 stops driving the driving device 153, drives the braking device 155, and stops traveling the own vehicle 1A (step S11). If the distance between the own vehicle graphic and the target object is not the previously set distance or less (NO in step S10), the obstacle detection device 100 shifts to determination in step S12.

Then, details of the inside/outside determination processing in step S6 will be described with reference to the flowchart of FIG. 9.

First, the obstacle detection device 100 selects one of range graphics (step S61). Then, the obstacle detection device 100 selects clockwise two adjacent vertexes among vertexes of the selected range graphic (step S62). The selected two vertexes are set as A and B, and a point of a target object is set as a point U. It is assumed that the point A is positioned upstream and the point B is positioned downstream when the two adjacent vertexes of the range graphic are selected clockwise. Then, the obstacle detection device 100 generates a vector AB connecting coordinates of the target object and the selected two vertexes and a vector AU connecting the upstream vertex A and the point U of the target object, and calculates an outer product AB×AU of the generated vectors (step S63). Then, the obstacle detection device 100 determines whether or not there is an unselected combination of the two adjacent vertexes of the range graphic that has been selected in step S61 (step S64).

If the unselected combination of the two adjacent vertexes exists (YES in step S64), the processing flow returns to step S62. In step S62, the obstacle detection device 100 selects the two adjacent vertexes. If the unselected combination of the two adjacent vertexes does not exist (NO in step S64), the obstacle detection device 100 determines whether or not values of outer products respectively calculated for combinations of the two adjacent vertexes are all negative values (step S65). If the values of the outer products are not all negative values, that is, the values of the outer products include a positive value (NO in step S65), the obstacle detection device 100 determines that the position of the target object is outside the range graphic (step S67). If the values of the outer products are all negative values (YES in step S65), the obstacle detection device 100 determines that the position of the target object is inside the range graphic (step S66).

Then, the obstacle detection device 100 determines whether or not all the range graphics have been each selected as a target (step S68). If all the range graphics have not been each selected as a target (NO in step S68), the processing flow returns to step S61. In step S61, the obstacle detection device 100 selects one of the range graphics that have not been selected (step S61). If all the range graphics have been each selected as a target (YES in step S68), the obstacle detection device 100 determines whether or not the range graphic inside which the target object has been determined to be positioned exists (step S69).

If the range graphic inside which the target object has been determined to be positioned does not exist (NO in step S69), the obstacle detection device 100 determines that the target object is positioned outside all the range graphics (step S70). The obstacle detection device 100 determines that the target object is an obstacle determination target, and outputs coordinates of the target object.

If the range graphic inside which the target object has been determined to be positioned exists (YES in step S69), the obstacle detection device 100 determines that the target object is positioned inside the range graphic, and determines whether or not there is another target object that has not been processed (step S71). If the obstacle detection device 100 determines that the other target object that has not been processed exists (YES in step S71), the processing flow returns to step S61. If the obstacle detection device 100 determines that the other target object that has not been processed does not exist (NO in step S71), the processing flow proceeds to step S7.

As described above, the obstacle detection device 100 according to the present embodiment includes the input/output I/F 110, the acquisition unit 131, the operation control unit 132, the inside/outside determination unit 133, and the obstacle determination unit 134.

The acquisition unit 131 acquires path information as information about the parking path R to the parking position P where the own vehicle 1A is to be parked and range information representing a position and a range of a target object existing around the own vehicle 1A.

The operation control unit 132 generates a driving signal, for operating the traveling driving device 150 that travels the own vehicle 1A, according to the path information acquired by the acquisition unit 131, and outputs the generated driving signal to the traveling driving device 150.

The inside/outside determination unit 133 determines, when receiving surroundings information representing a situation around the own vehicle 1A from the path generation device 50 via the input/output I/F 110, whether the target object included in the received surroundings information is a target object positioned inside the range represented by the acquired range information or a target object positioned outside the range. That is, the inside/outside determination unit 133 determines whether a target object represented by sensor data received from the sonar unit 30 is the target object positioned inside the range represented by the range information or the target object positioned outside the range.

The obstacle determination unit 134 determines whether or not the target object that has been determined to be positioned outside the range by the inside/outside determination unit 133 is an obstacle to the own vehicle 1A traveling in the parking path R.

Therefore, the obstacle detection device 100 performs obstacle determination for the target object positioned outside the range represented by the range information, thereby making it possible to shorten a time period required to detect the obstacle that obstructs the own vehicle 1A and improve a detection accuracy of the obstacle that obstructs the own vehicle 1A.

The obstacle detection device 100 does not determine whether or not the target object that has been determined to be positioned inside the range by the inside/outside determination unit 133 is an obstacle to the own vehicle 1A traveling in the parking path R.

Therefore, the obstacle detection device 100 can shorten a time period required to detect the obstacle that obstructs the own vehicle 1A.

The inside/outside determination unit 133 calculates an outer product of a vector connecting respective coordinates of two adjacent vertexes of the range represented by the range information and a vector connecting respective coordinates of either one of the two vertexes and the target object, and determines whether the target object is positioned inside or outside the range represented by the range information based on a calculation result of the outer product.

Therefore, a determination accuracy for determining whether the obstacle is positioned inside or outside the range represented by the range information can be improved.

The obstacle determination unit 134 sets a plurality of determination points W on the parking path R, and generates an own vehicle graphic 310 representing a range occupied by the own vehicle 1A when the own vehicle 1A is positioned at each of the determination points W.

The obstacle determination unit 134 determines a target object spaced apart from the own vehicle graphic 310 by a previously set distance or less as an obstacle, and instructs the operation control unit 132 to stop traveling the own vehicle 1A when the target object that has been determined as the obstacle has been detected.

Therefore, when an obstacle that obstructs the own vehicle 1A traveling in the parking path has been detected, the traveling of the own vehicle 1A can be stopped.

The above-described embodiment is merely an illustration of one aspect of the present invention, and variations and applications are optionally possible without departing from the scope and spirit of the invention.

Figure 10:
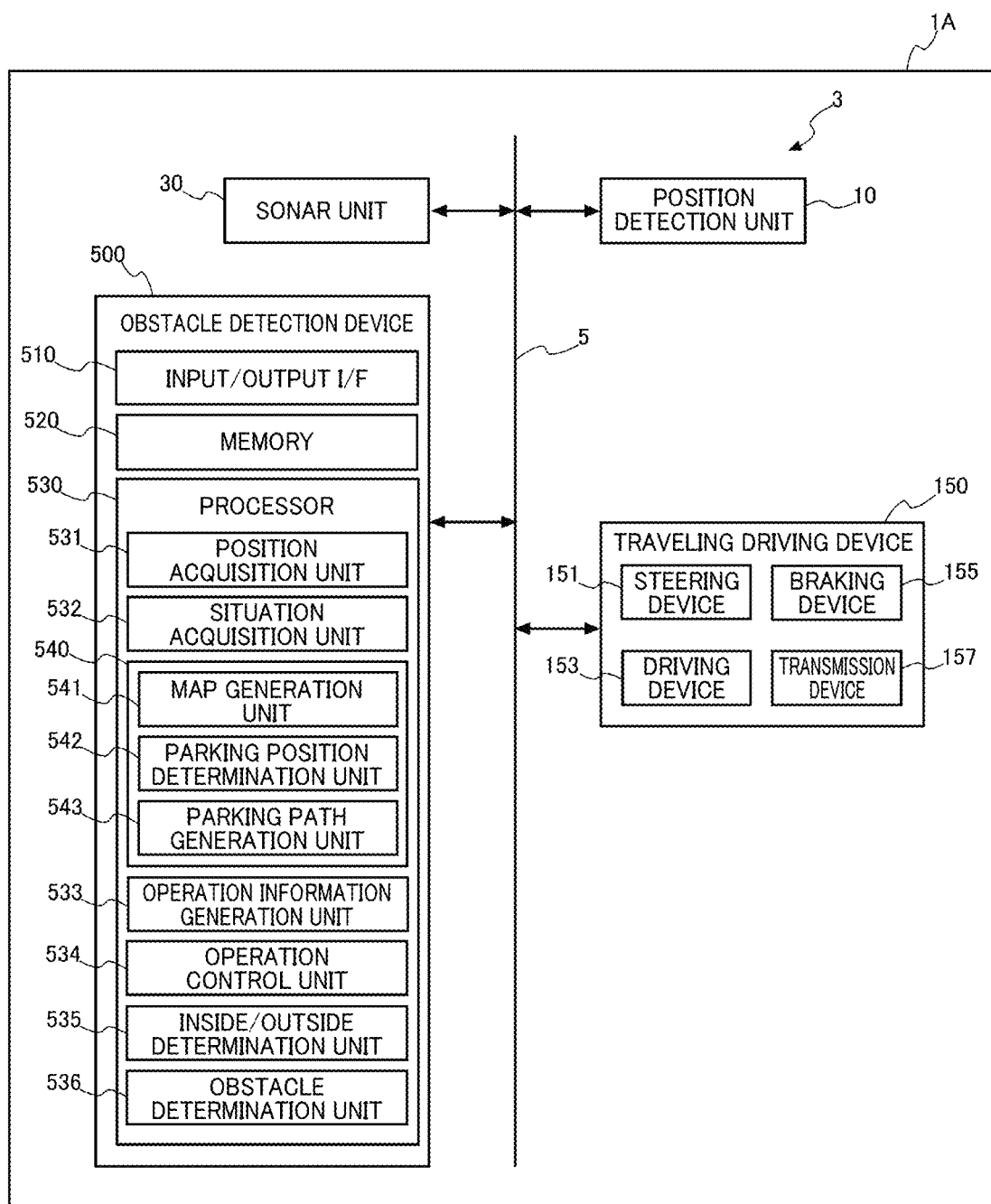
FIG. 10 is a block diagram illustrating a configuration of a modification of the obstacle detection device.

For example, the path generation device 50 and the obstacle detection device 100 may be respectively composed of separate computer devices, as illustrated in FIG. 1, or may be composed of one computer device, as illustrated in FIG. 10. FIG. 10 illustrates a configuration in which an obstacle detection device 500 includes a position acquisition unit 531, a situation acquisition unit 532, an acquisition unit 540, an operation information generation unit 533, an operation control unit 534, an inside/outside determination unit 535, and an obstacle determination unit 536. The acquisition unit 540 includes a map generation unit 541, a parking position determination unit 542, and a parking path generation unit 543. That is, the obstacle detection device 500 illustrated in FIG. 10 generates path information as information about a parking path to a parking position P and range information representing a position and a range of an object existing around an own vehicle 1A.

Although a case where a parking mode of the own vehicle 1A is a parallel parking is illustrated in FIGS. 2 to 7, the parking mode of the own vehicle 1A may be perpendicular parking or angle parking. The parallel parking is a parking manner for parking the own vehicle 1A such that the own vehicle 1A and another vehicle are arranged in a vehicle length direction of the own vehicle 1A. The angle parking is a parking manner for parking the own vehicle 1A in a parking stall provided diagonally to a path in front of or behind the parking stall.

Although FIGS. 2 to 7 illustrate a case where the range graphics 211, 213, and 225 representing the range of the target object each have a rectangular shape, the range graphics 211, 213, and 225 may not each have a rectangular shape but may each have a polygonal shape such as a triangular shape or a pentagonal shape.

The inside/outside determination unit 133 selects the two adjacent vertexes of the range graphic clockwise, and therefore determines that the point U of the target object is positioned outside the range graphic if the values of the outer products include even one positive value and determines that the point U is positioned inside the range graphic if the calculation results of the outer products are all negative values.

In addition thereto, the two adjacent vertexes of the range graphic may be selected counterclockwise. In this case, the inside/outside determination unit 133 determines that the point U of the target object is positioned outside the range graphic if the values of the outer products include even one negative value, and determines that the point U of the target object is positioned inside the range graphic if the calculation results of the outer products are all positive values.

A block diagram illustrating respective configurations of the path generation device 50 and the obstacle detection device 100 illustrated in FIG. 1 is a schematic view illustrated by classifying components depending on a main processing content to facilitate understanding of the present invention, and the components can also be classified into more components depending on a processing content. The components can also be classified such that one of the components performs more processes.

If an obstacle detection method according to the present invention is implemented using a computer, a program that the computer is caused to execute can also be configured in a form of a recording medium or a transmission medium that transmits the program. A magnetic or optical recording medium or a semiconductor memory device can be used for the recording medium. Specific examples include portable or fixed recording media such as a flexible disk, an HDD, a CD-ROM (compact disk read only memory), a DVD, a Blue-ray (registered trademark) Disc, a magnetooptical disk, a flash memory, and a card-type recording medium. The above-described recording medium may be a nonvolatile storage device such as a ROM or an HDD included in the path generation device 50.

Processing units in the flowchart illustrated in each of FIGS. 8 and 9 are obtained by dividing the processing units of the flowchart depending on a main processing content to facilitate understanding of the processing of the obstacle detection device 100. The present invention is not limited depending on a method of dividing the process of the obstacle detection device 100 and the name of the divided process. The processing of the obstacle detection device 100 may be divided into more processing units depending on the processing content. The processing of the obstacle detection device 100 may be divided such that one of the processing units includes more processes.

REFERENCE SIGNS LIST

- 1A Vehicle
- 1B Another vehicle
- 1C Another vehicle
- 3 In-vehicle apparatus
- 5 Communication bus
- 10 Position detection unit
- 30 Sonar unit
- 50 Path generation device
- 60 Input/output I/F (input interface)
- 70 Memory
- 80 Processor
- 81 Position acquisition unit
- 82 Situation acquisition unit
- 83 Map generation unit
- 84 Parking position determination unit
- 85 Parking path generation unit
- 86 Operation Information generation unit
- 100 Obstacle detection device
- 110 Input/output I/F
- 120 Memory
- 130 Processor
- 131 Acquisition unit
- 132 Operation control unit
- 133 Inside/outside determination unit
- 134 Obstacle determination unit
- 150 Traveling driving device (traveling driving unit)
- 151 Steering device
- 153 Driving device
- 155 Braking device
- 157 Transmission device
- 200 Peripheral map
- 201, 202, 203 Parking region
- 220 Wall
- 300 Obstacle map
- 310 Own vehicle graphic

What is claimed is:

1. An obstacle detection device comprising:
an input interface connected to an external device; and
a processor, wherein
the processor includes:
an acquisition unit configured to acquire path information as information about a parking path to a parking position where a vehicle is to be parked and range information representing a position and a range of an object existing around the vehicle;
an operation control unit configured to generate a driving signal according to the path information acquired by the acquisition unit and outputs the generated driving signal to a traveling driving unit configured to travel the vehicle, the driving signal being for operating the traveling driving unit;
an inside/outside determination unit configured to determine, when receiving surroundings information representing a situation around the vehicle from the external device via the input interface, whether an object included in the received surroundings information is an object positioned inside the range represented by the range information acquired by the acquisition unit or an object positioned outside the range; and
an obstacle determination unit configured to determine whether or not the object that has been determined to be positioned outside the range by the inside/outside determination unit is an obstacle to the vehicle traveling in the parking path,
wherein the obstacle determination unit does not determine whether or not the object that has been determined to be positioned inside the range is an obstacle to the vehicle traveling in the parking path.

2. The obstacle detection device according to claim 1, wherein the inside/outside determination unit calculates an outer product of a vector connecting respective coordinates of two adjacent vertexes of the range represented by the range information and a vector connecting respective coordinates of either one of the two vertexes and the object, and determines whether the object is positioned inside or outside the range represented by the range information based on a calculation result of the outer product.

3. The obstacle detection device according to claim 1, wherein
the obstacle determination unit
sets a plurality of determination points on the parking path represented by the path information,
calculates an own vehicle range as a range occupied by the vehicle when the vehicle is positioned at each of the determination points;
determines an object spaced apart from the own vehicle range by a previously set distance or less as an obstacle, and
instructs the operation control unit to stop traveling the vehicle when the object that has been determined as the obstacle is detected.

4. The obstacle detection device according to claim 1, wherein
the acquisition unit comprises
a path generation unit configured to generate the path information based on the surroundings information and position information representing a position of the vehicle, and
a map generation unit configured to generate range information representing the position and the range of the object existing around the vehicle based on the surroundings information.

5. An obstacle detection method comprising:
an acquisition step of acquiring path information as information about a parking path to a parking position where a vehicle is to be parked and range information representing a position and a range of an object existing around the vehicle;
an output step of generating a driving signal according to the acquired path information and outputting the generated driving signal to a traveling driving unit configured to travel the vehicle, the driving signal being for operating the traveling driving unit;
an inside/outside determination step of determining, when receiving surroundings information representing a situation around the vehicle, whether an object included in the received surroundings information is an object positioned inside the range represented by the range information acquired in the acquisition step or an object positioned outside the range; and an obstacle determination step of determining whether or not the object that has been determined to be positioned outside the range in the inside/outside determination step is an obstacle to the vehicle traveling in the parking path, wherein the obstacle determination step does not determine whether or not the object that has been determined to be positioned inside the range is an obstacle to the vehicle traveling in the parking path.

\* \* \* \* \*